United States Patent
Wolman et al.

(10) Patent No.: US 8,495,129 B2
(45) Date of Patent: Jul. 23, 2013

(54) ENERGY-AWARE CODE OFFLOAD FOR MOBILE DEVICES

(75) Inventors: Alastair Wolman, Seattle, WA (US);
Stefan Saroiu, Redmond, WA (US);
Ranveer Chandra, Kirkland, WA (US);
Paramvir Bahl, Bellevue, WA (US);
Aruna Balasubramanian, Amherst, MA (US); Eduardo Alberto Cuervo Laffaye, Durham, NC (US)

(73) Assignee: Microsoft Corporation, Redmond, WA (US)

( * ) Notice: Subject to any disclaimer, the term of this patent is extended or adjusted under 35 U.S.C. 154(b) by 465 days.

(21) Appl. No.: 12/724,428

(22) Filed: Mar. 16, 2010

(65) Prior Publication Data
US 2011/0231469 A1 Sep. 22, 2011

(51) Int. Cl.
*G06F 15/16* (2006.01)
(52) U.S. Cl.
USPC .......................................... 709/201; 709/224
(58) Field of Classification Search
USPC .................. 709/200–201, 224, 202
See application file for complete search history.

(56) References Cited

U.S. PATENT DOCUMENTS

| | | | | |
|---|---|---|---|---|
| 6,990,662 | B2 * | 1/2006 | Messer et al. | 717/174 |
| 2003/0084435 | A1 * | 5/2003 | Messer et al. | 717/174 |
| 2009/0258641 | A1 | 10/2009 | Yaqub et al. | |
| 2010/0205137 | A1 * | 8/2010 | Barsness et al. | 706/52 |

OTHER PUBLICATIONS

Seshasayee, et al., "Energy-aware Mobile Service Overlays: Cooperative Dynamic Power Management in Distributed Mobile Systems" Retrieved at << http://ieeexplore.ieee.org//stamp/stamp.jsp?tp=&arnumber=04273100 >>, Proceedings of the Fourth International Conference on Autonomic Computing, Jun. 11-15, 2007, pp. 1-10.
Chen, et al., "Energy-Aware Compilation and Execution in Java-Enabled Mobile Devices" Retrieved at << http://ieeexplore.ieee.org/stamp/stamp.jsp?arnumber=01213116 >>, Proceedings of the 17th International Symposium on Parallel and Distributed Processing, Apr. 22-26, 2003, pp. 1-8.
Gu, et al., "Adaptive Offloading for Pervasive Computing" Retrieved at << http://cairo.cs.uiuc.edu/~xgu/publications-files/aos-final.pdf >>, IEEE Pervasive Computing, vol. 3, No. 3, Jul. 2004, pp. 66-73.
Fjellheim, et al., "The 3DMA Middleware for Mobile Applications" Retrieved at << http://74.125.153.132/search?q=cache%3ADF-vBCuQc7oJ%3Aciteseerx.ist.psu.edu%2Fviewdoc%2Fdownload%3Fdoi%3D10.1.1.60.4260%26rep%3Drep1%26type%3Dpdf+3DMA+Middleware+for+Mobile+Applications&hl=en&gl=in >>, In Proceedings of Embedded and Ubiquitous Computing, International Conference EUC, Aug. 25-27, 2004, pp. 1-17.

(Continued)

*Primary Examiner* — Moustafa M Meky

(57) ABSTRACT

A method described herein includes an act of, at a mobile computing device, receiving an indication that a portion of code of a program executing on the mobile computing device is to be offloaded to a second computing device for execution on the second computing device, wherein the indication is based at least in part upon an estimated energy savings of the mobile computing device by offloading the portion of the code for execution on the second computing device. The method also includes an act of transmitting data to the second computing device that causes the second computing device to execute the portion of the code.

20 Claims, 9 Drawing Sheets

OTHER PUBLICATIONS

Li, et al., "Computation Offloading to Save Energy on Handheld Devices: A Partition Scheme" Retrieved at << http://delivery.acm.org/10.1145/510000/502257/p238-Ii.pdf?key1=502257&key2=4703015621&coll=GUIDE&dl=GUIDE&CFID=74317991&CFTOKEN=54974433 >>, Proceedings of the 2001 international conference on Compilers, architecture, and synthesis for embedded systems, Nov. 16-17, 2001, pp. 238-246.

Koul, et al., "E-Mobile: A heterogeneous agent-based, remote off-loading framework for efficient energy management of mobile devices" Retrieved at <<http://pp.cs.wisc.edu/~meetraja/Site/Raja_Bala_@_UW-Madison_files/EnergyMgmt838_Rohit_Raja.jpdf >>, Retrieved Date: Feb. 2, 2010, pp. 1-10.

"Mobius: A Multi-Tier Socially-Aware Network Infrastructure" Retrieved at << http://www.cse.usf.edu/dsg/mobius/ >>, Retrieved Date: Feb. 2, 2010, pp. 1-3.

"3GPP: Setting the Standard for Mobile Broadband" Retrieved at << http: //www.3gpp.org/. >>, pp. 1.

Balan, et al., "The case for cyber foraging" Retrieved at << http://www.cs.cmu.edu/~rajesh/papers/sigops02.pdf >>, Proceedings of the 10th workshop on ACM SIGOPS European workshop, Jul. 1, 2002, pp. 1-6.

Balan, Rajesh Krishna., "Simplifying Cyber Foraging" Retrieved at << http://apollo.smu.edu.sg/papers/CMU-CS-06-120.pdf >>, Proceedings of the 5th international conference on Mobile systems, applications and services, Jun. 11-13, 2007, pp. 1-291.

Balan, et al., "Tactics-based Remote Execution for Mobile Computing" Retrieved at << http://www.cs.cmu.edu/~rajesh/papers/mobisys03.pdf >>, Proceedings of the 1st international conference on Mobile systems, applications and services, May 5-8, 2003, pp. 1-14.

Chun, et al., "Augmented Smartphone Applications through Clone Cloud Execution" Retrieved at << http://berkeley.intel-research.net/bgchun/clonecloud-hotos09.pdf >>, HotOS, 2009, pp. 1-5.

Clark, et al., "Live Migration of Virtual Machines" Retrieved at << http://www.cl.cam.ac.uk/research/srg/netos/papers/2005-migration-nsdi-pre.pdf >>, In Proceedings of the 2nd ACM/USENIX Symposium on Networked Systems Design and Implementation (NSDI), 2005, pp. 1-14.

"Sibeam Reveals 60ghz Wireless Semiconductor Technology" Retrieved at << http://www.digitaltvnews.net/content/?p=240. >>, pp. 1-4.

Doan, et al., "Design Considerations for 60 Ghz Cmos Radios" Retrieved at << http://ieeexplore.ieee.org/stamp/stamp.jsp?tp=&arnumber=1367565&isnumber=29940 >>, IEEE Communications Magazine, 2004, pp. 132-140.

Douglis, et al., "Transparent Process Migration: Design Alternatives and the Sprite Implementation" Retrieved at <<http://66.102.9.132/search?q=cache%3ATv1BivwyFGkJ%3Aciteseerx.ist.psu.edu%2Fviewdoc%2Fdownload%3Fdoi%3D10.1.1.14.7130%26rep%3Drep1%26type%3Dpdf+ransparent+Process+Migration%3A+Design+Alternatives+and +the+Sprite+Implementation&hl=en >>, Software—Practice & Experience, vol. 21, No. 8, Aug. 1991, pp. 1-41.

"Ecma Demonstrates Multi-gigabit Radio" Retrieved at << http: //www.ecma-international.org/news/ >>, Ecma International Press Release, Nov. 20, 2008, pp. 1-2.

Flinn, et al., "Self-tuned Remote Execution for Pervasive Computing" Retrieved at << http://www.cs.cmu.edu/~aura/docdir/hotos01.pdf >>, Proceedings of the Eighth Workshop on Hot Topics in Operating Systems, May 20-22, 2001, pp. 1-6.

Flinn, et al., "Balancing Performance, Energy, and Quality in Pervasive Computing" Retrieved at << http://citeseerx.ist.psu.edu/viewdoc/download?doi=10.1.1.116.904&rep=rep1&type=pdf >>, Proceedings of the 22nd International Conference on Distributed Computing Systems (ICDCS'02), Jul. 2-5, 2002, pp. 1-14.

Flinn, et al., "Data Staging on Untrusted Surrogates" Retrieved at << http://www.intel-research.net/Publications/Pittsburgh/081620021310_92.pdf >>, Intel Research Publications, May 2002, pp. 1-14.

Gray, Robert S., "Agent Tcl: a Flexible and Secure Mobile-agent System" Retrieved at << http://citeseer.ist.psu.edu/cache/papers/cs/1492/http:zSzzSzactcomm.dartmouth.eduzSzpaperszSzgray:thesis.pdf/gray97agent.pdf >>, In Proceedings of the Fourth Annual Tcl/Tk Workshop (TCL 96), pp. 1-297.

"D. Hesse. Sprint's CEO Dan Hesse Chats with Charlie Rose" Retrieved at << http://blueroomsolution.com/showthread.php?t=5689, 2007 >>, BlueRoomSolution, Mar. 12, 2010, pp. 1-2.

Huang, et al., "Anatomizing Application Performance Differences on Smartphones" Retrieved at << http://www.eecs.umich.edu/techreports/cse/2009/CSE-TR-556-09.pdf >>, Microsoft Research, 2010, pp. 1-13.

Hunt, et al., "The Coign Automatic Distributed Partitioning System" Retrieved at << ftp://ftp.research.microsoft.com/pub/tr/tr-98-40.pdf >>, Proceedings of the 3rd Symposium on Operating System Design and Implementation (OSDI '99), Feb. 1999, pp. 1-15.

Joseph, et al., "Rover: A Toolkit for Mobile Information Access" Retrieved at << http://www.cs.umass.edu/~mcorner/courses/691M/papers/joseph.pdf >>, Proceedings of the fifteenth ACM symposium on Operating systems principles 1995, Dec. 3-6, 1995, pp. 1-16.

Kansal, et al., "Fine-grained Energy Profiling for Power-aware Application Design" Retrieved at << http://research.microsoft.com/en-us/um/people/zhao/pubs/hotmetrics08joulemeter.pdf >>, ACM SIGMETRICS Performance Evaluation Review, vol. 36, No. 2, Sep. 2008, pp. 1-5.

Kim, et al., "Safety, visibility, and performance in a wide-area file system" Retrieved at << http://citeseerx.ist.psu.edu/viewdoc/download?doi=10.1.1.3.3001&rep=rep1&type=pdf >>, Proceedings of the 1st USENIX Conference on File and Storage Technologies, Jan. 28-30, 2002, pp. 1-14.

Kincaid, Jason, "Youtube mobile uploads up 400% since iphone 3gs launch" Retrieved at << http://www.techcrunch.com/2009/06/25/youtube-mobile-uploads-up-400-since-iphone-3gs -launch/, 2009 >>, Techcrunch, Jun. 25, 2009, pp. 1.

Kougiouris, Panos, "Use reflection to discover and assess the most common types in the .net framework" Retrieved at << http://msdn.microsoft.com/en-us/magazine/cc188926.aspx >>, MSDN, pp. 1-11.

Kremer, et al., "Compiler-directed Remote Task Execution for Power Management" Retrieved at << http://eprints.kfupm.edu.sa/30892/1/30892.pdf >>, Workshop on Compilers and Operating Systems for Low Power, 2000, pp. 1-8.

Lewin, James, "Iphone users 30 times more likely to watch youtube videos" Retrieved at << http://www.podcastingnews.com/2008/03/19/ iphone-users-30-times-watch-youtube-videos/ >>, OLX Free Classifieds, Mar. 19, 2008, pp. 1-2.

"Monsoon Solutions Inc" Retrieved at << http://www. msoon.com/ >>, Retrieved Date Feb. 3, 2010, pp. 1.

Mullender, et al., "Amoeba—A Distributed Operating System for the 1900s" Retrieved at << http://citeseerx.ist.psu.edu/viewdoc/download?doi=10.1.1.103.8916&rep=rep1&type=pdf >>, IEEE Computer, 1990, pp. 1-13.

Neubauer, et al., "From Sequential Programs to Multi-tier Applications by Program Transformation" Retrieved at << http://citeseer.ist.psu.edu/cache/papers/cs2/693/http:zSzzSzwww.informatik.uni-freiburg.dezSz~neubauerzSzpaperszSzpopl05.pdf/neubauer05from.pdf>>, Proceedings of the 32nd ACM SIGPLAN-SIGACT symposium on Principles of programming languages, vol. 40, No. 1, Jan. 2005, pp. 1-12.

Newton, et al., "Wishbone: Profile-based Partitioning for Sensornet Applications" Retrieved at << http://www.usenix.org/event/nsdi09/tech/full_papers/newton/newton.pdf >>, 6th USENIX Symposium on Networked Systems Design and Implementation, NSDI '09, vol. 40, No. 1, Jan. 2005, pp. 395-408.

Noble, et al., "Agile Application-aware Adaptation for Mobility" Retrieved at << http://www.cs.cmu.edu/~coda/docdir/s16.pdf >>, ACM SIGOPS Operating Systems Review, vol. 31, No. 5, Dec. 1997, pp. 1-12.

"Canadian Consumer Battery Baseline Study—Final Report" Retrieved at << http://web4.uwindsor.ca/units/chemicalcontrolcentre/CCcenter.nsf/982f0e5f06b5c9a285256d6e006cff78/620d5a 48c51168e4852576110065d48f/$FILE/Battery_Study_eng. pdf >>, The Green Lane, Environment Canada's World Wide Web site, Feb. 2007, pp. 1-90.

Osman, et al., "The design and Implementation of Zap: A System for Migrating Computing Environments" Retrieved at << http://www.ncl.cs.columbia.edu/publications/osdi2002_zap.pdf >>, Proceedings of the 5th Symposium on Operating Systems Design and Implementation (OSDI 2002), Dec. 2002, pp. 1-16.

Palacin, MR, "Recent Advances in Rechargeable Battery Materials: A Chemists Perspective" Retrieved at << http://www.ncbi.nlm.nih.gov/pubmed/19690737 >>, PubMed, U.S. National Library of Medicine National Institutes of Health, Jun. 23, 2009, pp. 1.

Powers, Robert A., "Batteries for Low Power Electronics" Retrieved at << http://ieeexplore.ieee.org/stamp/stamp.jsp?tp=&arnumber=371974&isnumber=8511 >>, Proceedings of the IEEE, vol. 83, No. 4, Apr. 1995, pp. 687-693.

Prasad, et al., "Bandwidth Estimation: Metrics, Measurement Techniques, and Tools" Retrieved at << http://www.cc.gatech.edu/~dovrolis/Papers/NetDov0248.pdf >>, IEEE Network, Nov./Dec. 2003, pp. 1-12.

Satyanarayanan, et al., "The Case FOR VM-Based Cloudlets in Mobile Computing" Retrieved at << http://www.sis.smu.edu.sg/research/diagram/Cloudlets-SATYA.pdf >>, IEEE Pervasive Computing, vol. 8, No. 4, Oct. 2009, pp. 1-10.

Savage, Stefan, "Sting: a TCP-based Network Measurement Tool" Retrieved at << http://cseweb.ucsd.edu/~savage/papers/Usits99.pdf >>, Proceedings of the 2nd conference on USENIX Symposium on Internet Technologies and Systems, vol. 2, Oct. 11-14, 1999, pp. 1-9.

Su, et al., "Slingshot: Deploying Stateful Services in Wireless Hotspots" Retrieved at << http://www.usenix.org/events/mobisys05/tech/full_papers/su/su.pdf >>, Proceedings of the 3rd international conference on Mobile systems, applications, and services, Jun. 6-8, 2005, pp. 79-92.

Weiser, et al., "Scheduling for Reduced CPU Energy" Retrieved at << http://66.102.9.132/search?q=cache: KFtIDk5CQVoJ:www.ubiq.com/hypertext/weiser/ReducedEnergyScheduling.ps+Scheduling+for+reduced+cpu+energy&cd=4&hl=en&ct=cInk >>, Proceedings of the 1st USENIX conference on Operating Systems Design and Implementation, Nov. 14-17, 1994, pp. 1-15.

"WiMAX Forum" Retrieved at http://www.wimaxforum.org/ >>, Retrieved Date Feb. 3, 2010, pp. 1.

Young, et al., "Protium, an Infrastructure for Partitioned Applications" Retrieved at << http://i30www.ira.uka.de/teaching/coursedocuments/10/protium-slides.pdf >>, Proceedings of the Eighth Workshop on Hot Topics in Operating Systems, May 20-22, 2001, pp. 0-13.

Yu, et al., "Adaptive Rf Chain Management for Energy-efficient Mimo Transmission" Retrieved at << http://www.bibsonomy.org/bibtex/2fd5912568097f7dc718a34d15633b928/dblp >>, Proceedings of the 14th ACM/IEEE international symposium on Low power electronics and design, Aug. 19-21, 2009, pp. 1.

* cited by examiner

ENERGY-AWARE CODE OFFLOAD FOR MOBILE DEVICES

BACKGROUND

Mobile computing devices such as mobile telephones are continuously being equipped with advanced hardware, such as processors that have more processing capabilities than previous processors and an increased amount of memory, that can allow execution of complex/interactive programs thereon. One of the largest obstacles for future growth in mobile computing devices is battery technology. As processors are becoming faster, screens are getting sharper, and devices are being equipped with more sensors, an ability of a mobile computing device to consume energy far outpaces current abilities of batteries to provide energy to such hardware. Unfortunately, technology trends for batteries indicate that these limitations are not going away, and that energy will remain a primary bottleneck for many mobile computing devices.

A conventional technique to reduce energy requirements of mobile computing devices is to cause execution of at least part of a program to occur remotely. In other words, mobile computing devices can take advantage of resource-rich infrastructure devices by transmitting code for execution to remote servers. A conventional approach for offloading code to a remote computing device requires that developers indicate how a program is to be partitioned during development of such program. Additionally, the developers can indicate how to adapt partitioning of a program to changing network conditions. Having programmers dictate which portions of a program are offloaded under certain conditions can lead to relatively large energy savings. Requiring developers, however, to indicate with such granularity how programs are to be partitioned, how states are to be transferred, etc., is a great burden on developers, and can significantly increase development time of applications.

Another conventional approach is to entirely offload a process or virtual machine from the mobile computing device to an infrastructure device. Thus, entire applications or even operating systems can be migrated to a remote device. This approach can reduce the burden on developers, because applications need not be modified to take advantage of remote execution. There is a significant energy cost, however, in entirely migrating a program or operating system from a mobile computing device to an infrastructure device.

SUMMARY

The following is a brief summary of subject matter that is described in greater detail herein. This summary is not intended to be limiting as to the scope of the claims.

Described herein are various technologies pertaining to performing energy-aware code offload from a mobile computing device, such as a mobile telephone, to an infrastructure device, which may be an access point, a server, or another (dedicated) computing device. A developer can, for instance, write a program in a type-safe language such as C#. When writing the program, the developer can indicate which methods and/or classes of the program may be offloaded from the mobile computing device to a second computing device, such as a personal computer, an infrastructure device, etc. The developer need not state which methods/classes must be offloaded from the mobile computing device, but can instead annotate which methods/classes may possibly be offloaded from the mobile computing device to the second computing device. Pursuant to an example, the developer can indicate that methods/classes are offloadable, wherein such methods/classes are not utilized to control a display screen of a computing device, receive data from sensors of the computing device, etc. Furthermore, pursuant to an example, an application virtual machine (also known as a process virtual machine) can be provided for execution on the mobile computing device and the second computing device, such that differences in underlying hardware (especially the CPU instruction set architecture) on the mobile computing device and the second computing device need not be contemplated when developing the program.

The program for execution on the mobile computing device may be any suitable program, including a program utilized to view video on the mobile computing device, a video game, a speech recognition program, etc. In operation, the mobile computing device can receive an indication from a user or computer process to begin executing a program that has offloadable portions of code (methods/classes) as marked by the developer of the program. The mobile computing device can be configured with functionality that detects that the program has offloadable portions of code, and can initiate communications with the second device. For example, the mobile computing device can connect with an access point which is in communication with the second computing device. The second computing device may then retrieve the program if the second computing device does not already have access to such program. For instance, the mobile computing device can be configured to transmit the program to the second computing device. In another example, the second computing device may be configured to retrieve the program from a web server or some other device in a network cloud.

The second computing device can also receive an energy profile of the mobile computing device. For example, the second computing device can receive the energy profile from the mobile computing device or from another computing device in the network cloud. The second computing device can also receive or generate a network profile pertaining to a network connection between the second computing device and the mobile computing device. The network profile can be generated by the mobile computing device or the second computing device, for instance, by obtaining an estimate of data throughput over the network connection. Other data pertaining to the network connectivity may also be obtained by the second computing device and/or the mobile computing device, such as bandwidth and latency.

Furthermore, the infrastructure device and the mobile device can calculate an energy profile for the program (program profile). For example, the infrastructure device and/or the mobile device can estimate CPU costs associated with executing methods in the program, can perform serialization to determine shipping costs (i.e., size of the program state needed to execute a method), amongst other costs associated with executing the program. This program profile can pertain to estimates in performance of the program executing on the mobile device and/or the infrastructure device, and can be utilized by the mobile device and the infrastructure device. Based at least in part upon the energy profile of the mobile computing device, the program profile, and the network profile, the second computing device can generate an estimated savings of energy obtained by executing methods on the second computing device versus executing methods on the mobile computing device. Additionally or alternatively, the mobile computing device can generate the estimated savings of energy based at least in part upon the aforementioned profiles. This approach can be holistic in nature, in that the second computing device and/or the mobile computing device can take into consideration the program in its entirety, rather than each method individually. Based at least in part upon this estimate of energy savings, the second computing device and/or the mobile computing device can generate data that indicates which methods/classes in the program are to be executed remotely (on the second computing device rather than on the mobile computing device). In an example, this data may be transmitted from the second computing device to the mobile computing device.

The mobile computing device can receive the data and can continue executing the program until a method marked as being desirably offloaded is reached. The mobile computing device can be configured to determine which portion of a program state pertaining to the method is needed to execute the method, and can transmit such portion of the program state to the second computing device. The second computing device can receive the program state and can execute the method utilizing such program state. Upon completion of executing the method, the second computing device can determine which portion of a program state is needed by the mobile computing device to continue executing the program, and cause such portion of the program state to be transmitted to the mobile computing device. Utilizing this portion of the program state, the mobile computing device can continue executing the program until another method to be offloaded is reached. Meanwhile, the infrastructure device can periodically (or from time to time) update the data pertaining to which methods should be offloaded, as network conditions can change, estimates of costs of shipping program states can alter over time, etc.

Other aspects will be appreciated upon reading and understanding the attached figures and description.

DETAILED DESCRIPTION

Figure 1:
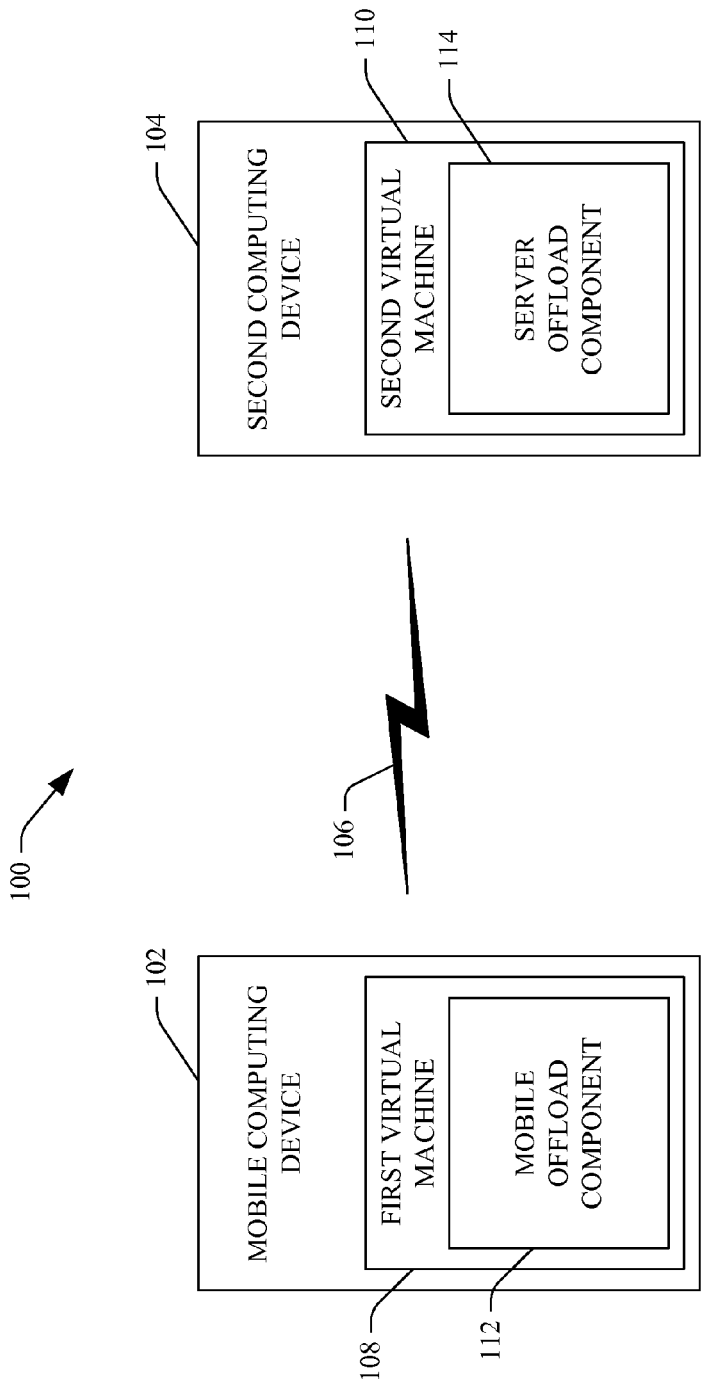
FIG. 1 is a functional block diagram of an example system that facilitates selectively offloading execution of portions of code from a mobile computing device to a second computing device in an energy-aware manner.

Various technologies pertaining to energy-aware offload of execution of code from a mobile computing device to an infrastructure device will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates offloading execution of a portion of code from a mobile computing device in an energy-aware manner is illustrated. The system 100 includes a mobile computing device 102. The mobile computing device 102 may be any suitable mobile computing device, such as but not limited to, a mobile phone, a laptop computer, a portable media player, a netbook, or the like. The system 100 also comprises a second computing device 104 which is in communication with the mobile computing device 102 by way of a network connection 106. In an example, the second computing device 104 may be an infrastructure device, such as an access point, a switch, or the like. In another example, the second computing device 104 may be a personal computing device such as a desktop computer or a separate server device that can be in communication with the mobile computing device 102 by way of an access point or switch. The network connection 106 may at least partially be a wireless connection, such as a Wi-Fi connection, a Wi-Max connection, a 3G connection, a Bluetooth connection, or some other suitable wireless connection.

As will be described in greater detail below, the mobile computing device 102 and the second computing device 104 can act in conjunction to offload execution of code of a program from the mobile computing device 102 to the second computing device 104 in a selective, energy-aware manner. For instance, the mobile computing device 102 and the second computing device 104 can act in conjunction to cause the mobile computing device 102 to offload a portion of code for a program for execution on the second computing device 104, based at least in part upon an estimated energy savings obtained by the mobile computing device 102 by having the portion of code executed on the second computing device 104 versus executing the portion of code on the mobile computing device 102.

The mobile computing device 102 can be equipped with a first virtual machine 108 that executes on the mobile computing device 102. Similarly, the second computing device 104 can be equipped with a second virtual machine 110 that executes on the second computing device 104. The virtual machines 108 and 110 can be utilized to allow programs to be executed on the mobile computing device 102 and the second computing device 104 without regard to different hardware architectures of the mobile computing device 102 and the second computing device 104. Pursuant to an example, the virtual machines 108-110 can be configured to execute programs written in accordance with the CLI standard. The CLI standard defines executable code in a runtime environment that allows high-level languages to be utilized to execute code on different computing platforms. Furthermore, the first virtual machine 108, in an example, can include support for transmitting code written in accordance with the CLI standard from the mobile computing device 102 to the second computing device 104, if desired. Of course, other embodiments are also contemplated by the inventors, and are intended to fall under the scope of the hereto-appended claims. For instance, a developer may develop a same program in different manners to take into consideration differences in architecture on the mobile computing device 102 and the second computing device 104. In another example, the first virtual machine 108 may be considered to execute code written in any suitable type-safe language (e.g., the code may not accord to the CLI standard).

The mobile computing device 102 may further comprise a mobile offload component 112 that can be executed by the first virtual machine 108. The mobile offload component 112 can be configured to analyze a program that is desirably executed on the mobile computing device 102 to ascertain whether any portions (e.g., methods or classes) of the program can be offloaded for execution on the second computing device 104. In an example, an application developer can utilize an application programming interface to indicate methods/classes in a program that may be offloadable for execution on the second computing device 104 rather than on the mobile computing device 102. For example, the application developer can modify source code of the program by adding a particular attribute to a method that indicates that it is safe to execute the method remotely.

When the mobile computing device 102 receives a request to execute the program (e.g., from a user or a computer process), the mobile offload component 112 can be configured to initiate the network connection 106 between the mobile computing device 102 and the second computing device 104 (if a connection did not previously exist). This network connection 106 may be made through an access point such as a wireless router, via a cell phone tower, or the like. The mobile computing device 102 can select an access point based upon any suitable technique, including estimated data throughput from the mobile computing device 102 to the second computing device 104 by way of the access point, a number of mobile computing devices currently in communication with the second computing device 104, current processor load on the second computing device 104, or any other suitable technique. Once the network connection 106 exists between the mobile computing device 102 and the second computing device 104, the program desirably executed on the mobile computing device 102 can be received by the second computing device 104 (if the second computing device 104 does not already have such program stored thereon). In an example, the mobile computing device 102 can be configured to transmit the executable program to the second computing device 104 by way of the network connection 106. In another example, the second computing device 104 can be configured to retrieve the program from another infrastructure device, or from the cloud, thereby saving energy of the battery of the mobile computing device 102.

The second computing device 104 may comprise a server offload component 114. The server offload component 114 can be configured to receive an energy profile corresponding to the mobile computing device 102, a network profile that pertains to performance and energy parameters of the network connection 106, and a program profile that is indicative of performance of a program that is desirably executed. In an example, the energy profile of the mobile computing device 102 can be indicative of an amount of energy consumed when executing a method as a function of a number of CPU cycles required to execute the method. Thus, pursuant to an example, the energy profile of the mobile computing device 102 can be a simple linear model. The network profile can be indicative of throughput of data transmitted between the mobile computing device 102 and the second computing device 104 over the network connection 106. For instance, a particular number of kilobytes of data can be transmitted by way of TCP from the mobile computing device 102 to the second computing device 104, and the transfer duration can be measured to obtain an average throughput. The mobile offload component 112 and/or the server offload component 114 can be configured to update the network profile over time.

The mobile offload component 112 and/or server offload component 114 can also be configured to generate the program profile. For example, each method in the program can be instrumented to measure state transfer requirements pertaining to each method, runtime duration of each method, and number of CPU cycles required to execute each method. As will be described in greater detail below, this data can be utilized by the mobile offload component 112 and/or the server offload component 114 to generate the program profile. The server offload component 114 and/or the mobile offload component 112 may then determine an estimate of energy savings for at least one method in the program with respect to executing the method on the second computing device 104 versus executing the method on the mobile computing device 102. In an example, if the server offload component 114 computes the estimate of energy savings, the server offload component can be configured to transmit a data packet to the mobile computing device 102 that indicates which methods are to be offloaded to the second computing device 104 for execution thereon. Alternatively, the mobile offload component 112 can be configured to compute the estimate of energy savings, and can offload at least one method for execution on the second computing device 104 based at least in part upon such estimate of energy savings.

As the mobile computing device 102 executes the program, the mobile computing device 102 may reach a method that is to be offloaded to the second computing device 104 (as indicated in the data packet received from the second computing device 104). The mobile offload component 112 can be configured to determine which program state information pertaining to the method that needs to be offloaded to allow the second computing device 104 to execute the method. Appropriate state information can be transmitted by way of the network connection 106 to the second computing device 104. The server offload component 114 can receive this state information and can execute the method using the state information provided by the mobile computing device 102. When the second computing device 104 has completed execution of the method, server offload component 114 can determine which program state information is needed by the mobile computing device 102 to continue executing the program, and such state information can be transmitted to the mobile computing device 102 by way of the network connection 106. The mobile computing device 102 may then continue executing the program until another method that is to be offloaded is reached. While the mobile computing device 102 is executing the program, the server offload component 114 or the mobile offload component 112 can be configured to update the network profile and/or the program profile. This data may be used to update energy savings estimates for executing methods on the second computing device 104 rather than on the mobile computing device 102. If the second computing device 104 updates the energy savings estimates, updates can be transmitted from the second computing device 104 to the mobile computing device 102. For example, degradation of connectively between the mobile computing device 102 and the second computing device 104 can cause additional methods to be executed locally on the mobile computing device 102, since transmitting such methods over the network connection 106 may consume additional energy.

If the network connection 106 is dropped when a method is executing on the second computing device 104, the mobile offload component 112 can utilize the most recently transmitted program state information to execute the method that was to be offloaded to the second computing device 104. Therefore, a dropping of the network connection 106 does not cause a significant amount of energy to be utilized to continue executing the program, and only a small amount of latency occurs with respect to executing the program, as the most recent program state information can be utilized to execute the method.

While certain functionality has been described as occurring on the mobile computing device 102 or the second computing device 104, it is to be understood that at least some of such functionality may occur on the other computing device, or may be distributed between computing devices. Furthermore, a third computing device (not shown) can be configured to perform one or more of such tasks.

Figure 2:
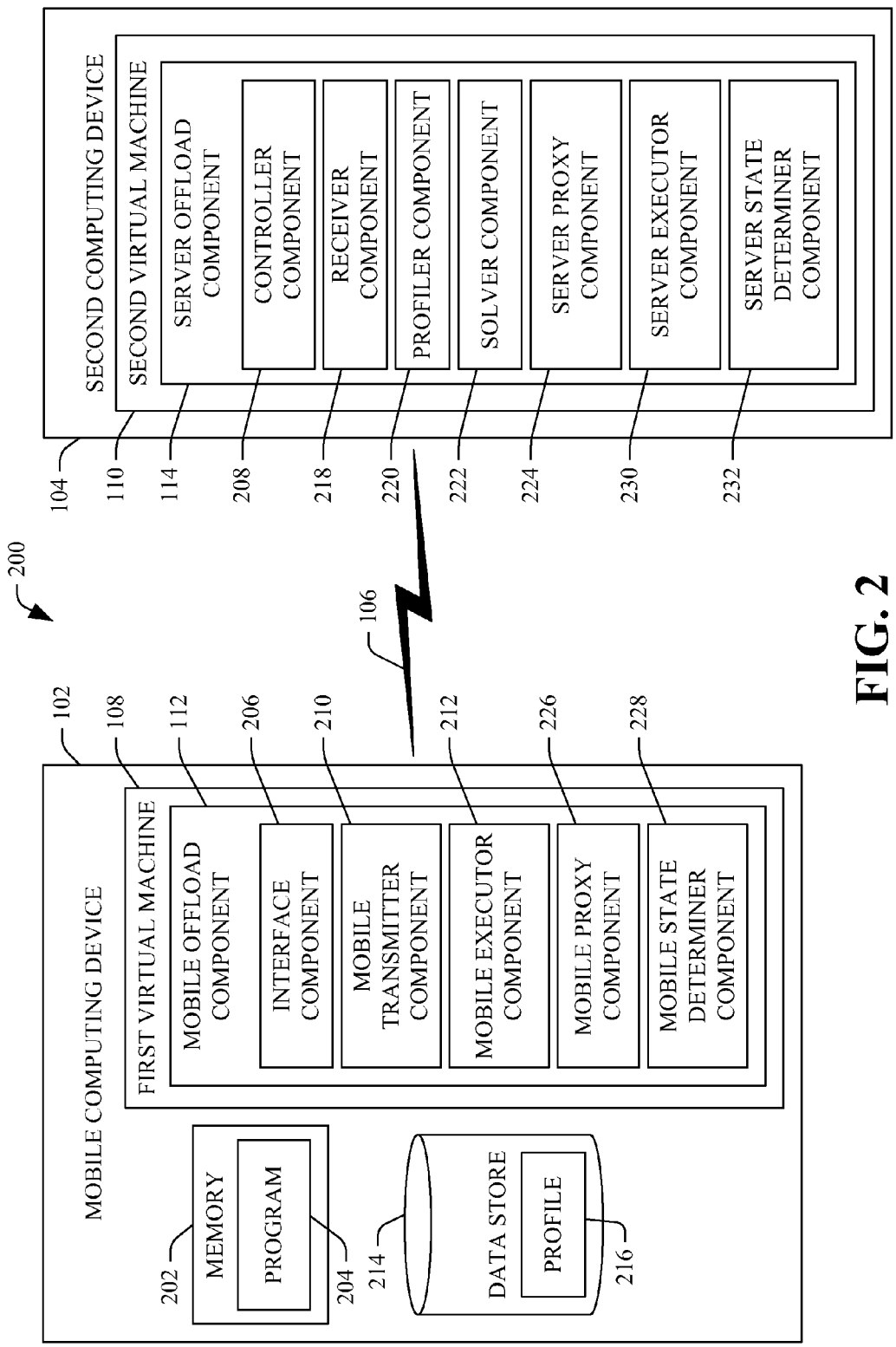
FIG. 2 is a functional block diagram of an example system that facilitates selectively offloading execution of portions of code from a mobile computing device in an energy-aware manner.

Referring now to FIG. 2, an example system 200 that facilitates performing energy-aware code offload from the mobile computing device 102 to the second computing device 104 is illustrated. The mobile computing device 102 comprises a memory 202 that includes a program 204 that is desirably executed on the mobile computing device 102. As indicated above, the program 204 can be written in a type-safe programming language such as C#. The mobile computing device 102 comprises the mobile offload component 112. The mobile offload component 112 comprises an interface component 206 that interfaces with the second computing device 104 upon a user or process indicating that the program 204 is desirably executed on the mobile computing device 102. For example, the interface component 206 can generate a request and have such request transmitted by way of the network connection 106 to the second computing device 104, wherein the request is configured to cause the mobile computing device 102 to be in communication with the second computing device 104. The second computing device 104 comprises the server offload component 114 which includes a controller component 208. The controller component 208 can receive the requests generated by the interface component 206, and can authenticate the mobile device 102 and/or the user thereof. Additionally, the controller component 208 can be configured to perform resource allocation for incoming requests to instantiate one or more programs that are desirably partially executed on the second computing device 104 amongst a plurality of mobile computing devices.

Once the controller component 208 authenticates the mobile computing device 102, the interface component 206 in the mobile offload component 112 can identify the program 204 that is desirably executed on the mobile computing device 102 and transmit the identity of the program 204 to the second computing device 102 by way of the network connection 106. The second computing device 104 can receive the identification and can search a data store thereon to determine if the second computing device 104 already has the program 204 stored thereon. If the second computing device 104 does not have access to such program 204, in an example embodiment the second computing device 104 can be in communication with another computing device in the cloud to retrieve such program 204. In an alternative embodiment, the mobile offload component 112 can comprise a mobile transmitter component 210 which can cause the program 204 to be copied and transmitted to the second computing device 104 by way of the network connection 106.

The mobile offload component 112 may also comprise a mobile executor component 212 that begins executing the program 204 in the memory 202. The mobile computing device 102 may also comprise a data store 214 that retains an energy profile 216 for the mobile computing device 102. In an example, the energy profile 216 can be a linear model that indicates energy consumption pertaining to a method to be executed on the mobile computing device 102 as a function of a number of CPU cycles the method requires to execute. For example, methods can be instrumented to determine a number of CPU cycles required to execute such methods, and battery power can be monitored to determine how much energy is utilized per CPU cycle. The energy profile 216 can also take into consideration a radio/transmitter being utilized to communicate with other devices (e.g., a Wi-Fi radio versus a 3G wireless radio). If the second computing device 104 does not have such profile 216 stored thereon, the mobile transmitter component 210 can cause the profile 216 to be transmitted to the second computing device 104 by way of the network connection 106. In another embodiment, the second computing device 104 can access a table of profiles for a plurality of different types of mobile computing devices, and can retrieve the profile 216 from a computing device in the cloud. In yet another embodiment, the mobile computing device 102 may be configured to perform estimates of energy savings locally, and therefore need not transmit the profile 216 to the second computing device 104.

A receiver component 218 on the second computing device 104 can be configured to receive the program 204 and/or the energy profile 216 of the mobile computing device 102. As described above, the program 204 can include methods/classes that are marked as being offloadable from the mobile computing device 102 for execution on a remote computing device (the second computing device 104).

A profiler component 220 can be in communication with the receiver component 218 and can generate for a network profile that pertains to energy use and performance of the network connection 106 and a program profile that pertains to energy consumption and performance of the program 204. In an example, the network profile can be generated by the profiler component 220 by transmitting 10 kilobytes of data over the network connection 106 to the mobile computing device 102, and the duration can be measured and an average throughput can be determined. The profiler component 220 can generate or update the network profile upon each communication with the mobile computing device 102. If a threshold amount of time has passed with no communication between the mobile computing device 102 and the second computing device 104, the profiler component 220 can cause another data packet to be transmitted by way of the network connection 106 to obtain a recent estimate of throughput. A sliding window may then be used to average a plurality of most recent estimates of throughput for inclusion in the energy profile of the network connection 106. In an alternative embodiment, the profiler component 220 can reside on the mobile computing device 102 such that the mobile computing device 102 transmits data to the second computing device 104 and generates the estimates of throughput thereon. In such an embodiment, the mobile transmitter component 210 can transmit the energy profile for the network connection 106 to the second computing device 104. Additionally, both the mobile computing device 102 and the second computing device 104 can generate network profiles.

As indicated above, the profiler component 220 can also generate a program profile. For example, the profiler component 220 can instrument each method in the program 204 to measure state transfer requirements of the method, runtime duration of the method, and number of CPU cycles required to execute the method. With respect to the state transfer requirements, such requirements are indicative of the program state needed to be transferred from the mobile computing device 102 to the second computing device 104 to execute a method in the program 204 on the second computing device 104, as well as the additional application state needed to be transmitted back from the second computing device 104 to the mobile computing device 102 after the method has been executed on the second computing device 104. Again, initially the profiler component 220 can estimate the state transfer requirements, and such estimates can be refined as methods of the program are actually executed by the mobile computing device 102 and/or the second computing device.

With more detail pertaining to program state transfer, in an example, when the program 204 is compiled, a wrapper can be generated for each method that has been marked as offloadable. The wrapper can add an additional input parameter and an additional return value. The additional input parameter is used to transfer a program state from the mobile computing device 102 to the second computing device 104, and the additional return value can be used to transfer the program state back from the second computing device 104 to the mobile computing device 102.

Performing application state transfer leverages the type-safe nature of a runtime environment that accords to the CLI Standard. Type safety allows traversal of the in-memory data structures used by the program 204, and allows only data which is potentially referenced by the method that is desirably offloaded to be transmitted over the network connection 106 to the second computing device 104. To determine which state information needs to be serialized beyond the explicit method parameters, in one example, all current member variables of an object can be serialized, including simple types and nested complex object types. The state of any static classes can also be serialized. When states of the program are transferred to and from the mobile computing device 102 and the second computing device 104, in an example, incremental deltas of the program state can be computed and transferred rather than an entire program state (unless the entire program state is smaller than shipping the deltas, and would require less energy consumption).

When the profiler component 220 generates the program profile, the profiler component 220 estimates the amount of state needed to be transmitted from the mobile computing device 102 to the second computing device 104. This amount of state includes size of all data potentially referenced by the method, as well as an amount of state required to be returned to the mobile computing device 102 once a method is completed executing on the second computing device 104. The profiler component 220 can utilize observed duration of the method and CPU cycles required to execute the method to estimate an amount of energy consumed when executing the method of the mobile computing device 102. Estimating energy consumption pertaining to a program can be challenging as programs are not deterministic, in that each subsequent invocation of a method can take a different code path, leading to a different running duration and energy profile than a previous invocation. Thus, the profiler component 220 can utilize past, observed invocations of a method as a predictor of future invocations.

As mentioned above, the second computing device 104 and the mobile computing device 102 can be configured to transmit incremental deltas in state, rather than full program state, to reduce network and energy overhead of program state transfer. The profiler component 220 can observe the behavior of the program 204 over time, and this past program behavior can be a predictor of how the program 204 will behave in the future. For example, when method A calls method B in the program 204, the profiler component 220 can measure size of state that would need to be transferred over the network to enable method B to execute on the second computing device 104. The profiler component 220 can generate this measurement regardless of whether B is actually remotely executed on the second computing device 104. Performance overhead of taking this measurement can be the cost of serializing to transform the state into a particular format, and then measuring size of a buffer. The more times the profiler component 220 observes method A calling method B, the better the estimate the profiler component 220 obtains of future behavior.

The introduction of state deltas can create complexities in estimating state transfer requirements. When method A calls method B, size of the state that needs to be transferred is now not only a function of the previous behavior of the program 204, but also a function of the runtime behavior of the mobile offload component 112 and the server offload component 114. For example, if a method has been offloaded recently, the delta state will likely be relatively small, whereas if a method has not been offloaded for a relatively long period of time, then the delta state may be significantly larger.

Another unintended consequence of calculating program state deltas is the performance impact it can have on interactive programs. Thus, various strategies can be utilized for profiling interactive applications such as video games. For example, the profiler component 220 can profile based upon a delta calculation and serialization on every call to an offloadable method. In another example, the profiler component 220 can utilize serialization only on each call to an offloadable method when generating the program profile. In yet another example, the profiler component 220 can utilize a delta state calculation and serialization on a first call to an offloadable method, and reuse this estimate without recomputing the estimate subsequent calls to the method. If the method is offloaded, the profiler component 220 can update such estimates. In still yet another example, the profiler component 220 can utilize serialization on the first call to the offloadable method to generate the energy profile for the program 204. The profiler component 220 can use any one of such strategies to generate the program profile.

A solver component 222 resident on the second computing device 104 can receive the profiles generated by the profiler component 220 (the network profile and the program profile) as well as the energy profile 216 of the mobile computing device 102, and can generate an estimated energy savings for executing methods on the second computing device 104 versus the mobile computing device 102. In an example, the solver component 222 can utilize the profiles output by the profiler component 220 and the energy profile 216 of the mobile computing device 102 as input to a global optimization problem that determines which offloadable methods should execute locally on the mobile computing device 102 and which should execute remotely on the second computing device 104. Thus, the solver component 222 is configured to locate a program partitioning strategy that minimizes the energy consumption of the mobile computing device 102, subject to any latency constraints. Deciding where to execute each method can be challenging, because such decision requires a global view of the behavior of the program 204. In an example, a program may include three methods. For each individual method, it may be more expensive to remotely execute such method; but when considered collectively, it may save energy to execute all methods on the second computing device 104.

To determine which methods to have executed locally and which methods to have executed on the second computing device 104, the solver component 222 can utilize a model of the execution behavior of the program 204, which can be in the form of a computer-implemented annotated graph. Such graph can be provided by the profiler component 220, for example. The solver component 222 can include a linear program solver to locate a substantially optimal partitioning strategy that minimizes energy consumed by the mobile computing device 102, subject to one or more latency constraints. For instance, a default latency constraint may be that the total execution latency L may not exceed 5 percent more than the latency incurred if all methods in the program are executed on the mobile computing device 102. Other latency constraints, however, may also be specified. The solver component 222 can initially estimate the energy savings utilizing the initial estimates of energy profiles provided by the profiler component 220, and may execute periodically as data is received from execution of the program 204 and the profiler component 220 updates energy profiles.

In more detail, the solver component can have access to a call graph of the program 204, G=(V, E). The call graph can represent the call stack as the program 204 executes. Each vertex v∈V represents a method in the call stack, and each edge e=(u, v) can represent an invocation of method v from method u. Each vertex v∈V can be annotated with an amount of energy it takes to execute the method locally $E_v^l$, the time required to execute the method on the mobile computing device 102 $T_v^l$, and the time required to execute the method on the second computing device 104 $T_v^r$. Each edge e=(u, v) can be annotated with an amount of time it takes to transfer appropriate program states $B_{u,v}$ when u calls v, and the energy costs of transferring that state $C_{u,v}$. Each vertex v can also be annotated with a parameter $r_v$ that indicates if the method is marked as being offloadable. If, for instance, a method is called from within a loop, all such costs are scaled up by a factor that corresponds an estimate output by the profiler component 220 of a number of loop iterations.

Formally, the solver component 222 solves the following 0-1 integer linear programming problem shown below. The solver component 222 solves for variable $I_v$. $I_v$ is the indicator variable. $I_v=0$ if method v is executed locally, and is $I_v=1$ if method v is executed remotely on the second computing device 104. The solver component 222 can solve the following objective function as follows:

$$\text{maximize} \sum_{v \in V} I_v \times E_v^l - \sum_{(u,v) \in E} |I_u - I_v| \times C_{u,v}$$

$$\text{such that} \sum_{v \in V} ((1 - I_v) \times T_v^l) + (I_v \times T_v^r) + \sum_{(u,v) \in E} (|I_u - I_v| \times B_{u,v}) \leq L$$

$$\text{and } I_v \leq r_v, \forall v \in V.$$

The first term in the objective function can represent the total energy saved by executing methods remotely on the second computing device 104. The savings are essentially the energy costs if the method has been executed on the mobile computing device 102. The second term in the objective function can capture the energy costs of data transfer to execute a method remotely on the second computing device 104. It can be noted that the data transfer incurs an entity costs only if the two methods, u and v, are not both executed in the same location. The first constraint stipulates that the total time to execute the program be within L. The second constraint stipulates that only methods marked as offloadable can be executed remotely.

A server proxy component 224 can be in communication with the solver component 222. The server proxy component 224 can receive data from the solver component 222 that indicates which methods are to be executed on the mobile computing device 102 and which methods are to be executed on the second computing device 104. The server proxy component 224 can cause such data to be transmitted in a data packet over the network connection 106 to the mobile computing device 102. A mobile proxy component 226 can receive such data packet and can be in communication with the mobile executor component 212 to inform the mobile executor component 212 of which methods are to be executed locally on the mobile computing device 102 and which methods are to be executed remotely on the second computing device 104. The mobile executor component 212 continues to execute the program 204 on the mobile computing device 102 until a method is reached that is marked as desirably offloaded to the second computing device 104. A mobile state determiner component 228 determines a state of the program 204 that is to be transmitted to the second computing device 104 for executing the method. Initially, the state can be an entirety of the program state. As described above, a wrapper can be generated at compile time for each method marked as offloadable, wherein the wrapper includes an additional input parameter and an additional return value, wherein the input parameter is used to transfer the program state from the mobile computing device 102 to the second computing device 104, and the additional return value is used to transfer the program state from the second computing device 104 to the mobile computing device 102.

When offloading a first method in the program, an entire program state can be transmitted to the second computing device 104. Afterwards, however, incremental deltas of the program state can be shipped, rather than the entire state, to conserve energy (unless sending the entire state is more energy efficient than transmitting a delta). The state determiner component 228 may provide such state to the mobile proxy component 226, which can retain this state information. The mobile transmitter component 210 may then transmit an indication of the method that is to be executed on the second computing device 104 together with the program state needed to execute such method.

The server proxy component 224 can receive this state information. The server executor component 230 can be in communication with the server proxy component 224, and can execute the method given the program state provided by the server proxy component 224. When the server executor component 230 completes executing the method, a server state determiner component 232 can determine an updated program state. As indicated previously, this updated program state may be transmitted to the mobile computing device 102 as a delta (a difference in the most recent program state transmitted from the mobile computing device 102). Specifically, the new program state or delta can be provided to the server proxy component 224, which can cause the updated state to be transmitted to the mobile computing device 102 by way of the network connection 106. The mobile proxy component 226 can receive the updated state and cause such updated state to be stored. The mobile executor component 212 can then continue executing the program 204 utilizing the updated program state.

If the network connection 106 is dropped when the server executor component 230 is remotely executing a method, then the mobile executor component 212 can access the most recent program state caused to be stored by the mobile proxy component 226, and execute the method locally on the mobile computing device 102. The profiler component 220 (which can generate a program profile on the mobile computing device 102 and/or the second computing device 104) can update the network profile and the program profile as program states are transmitted between the mobile computing device 102 and the second computing device 104, and as methods are executed, respectively. The solver component 222 may then update the estimates of energy savings by executing certain methods on the second computing device 104 versus executing the methods on the mobile computing device 102, and such updates can be provided to the mobile computing device 102. In an example, the solver component 222 can be configured to re-estimate energy savings periodically (e.g., every 20 seconds). When the program 204 has been executed, the network connection 106 between the mobile computing device 102 and the second computing device 104 can be dropped.

Figure 3:
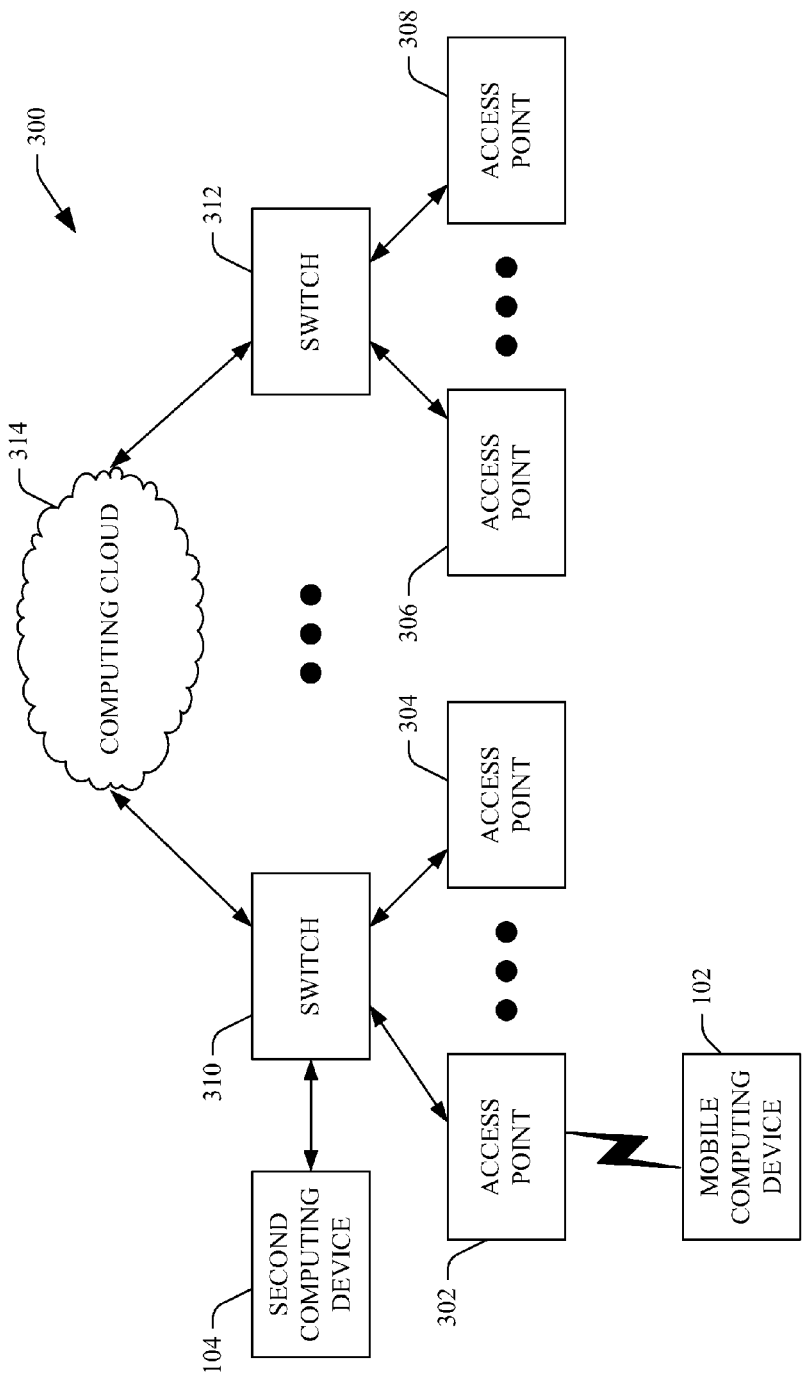
FIG. 3 is a functional block diagram illustrating an example embodiment of a network that comprises a mobile computing device and a second computing device.

Now referring to FIG. 3, an example computing environment 300 is illustrated. The computing environment 300 comprises a plurality of access points 302-308. The computing environment 300 also comprises a plurality of switches 310-312. The switches 310-312 are employed to transmit data packets to subsets of the access points 302-308. For instance, the switch 310 is configured to transmit data packets to the access points 302-304, and the switch 312 is configured to transmit data packets to the access points 306-308. These switches receive these data packets from a computing cloud 314, which may be or include web servers or other network devices.

The mobile computing device 102 establishes a wireless connection with the access point 302. For instance, this wireless connection can be established based at least in part upon signal strength of the access point 302 with respect to the mobile computing device 102, a number of computing devices that are connected to the access point 302, or other suitable parameter(s). The second computing device 104 is proximate to the switch 310. In an example, the second computing device can be included in the switch 310 or can be a separate computing device from the switch 310. As described above, it may be desirable to offload execution of portions of code from the mobile computing device 102 to the second computing device 104 to conserve energy utilized by the mobile computing device 102. In this example, the mobile computing device 102 can communicate with the second computing device 104 by way of the access point 302 and the switch 310. While the partitioning of a program for execution on the mobile computing device 102 and the second computing device 104 has been described above, in an embodiment execution of an entire program or operating system can be offloaded to the second computing device 104. Furthermore, in an alternative embodiment, the second computing device 104 may be directly in contact with the access point 302 or be included in the access point 302.

Figure 4:
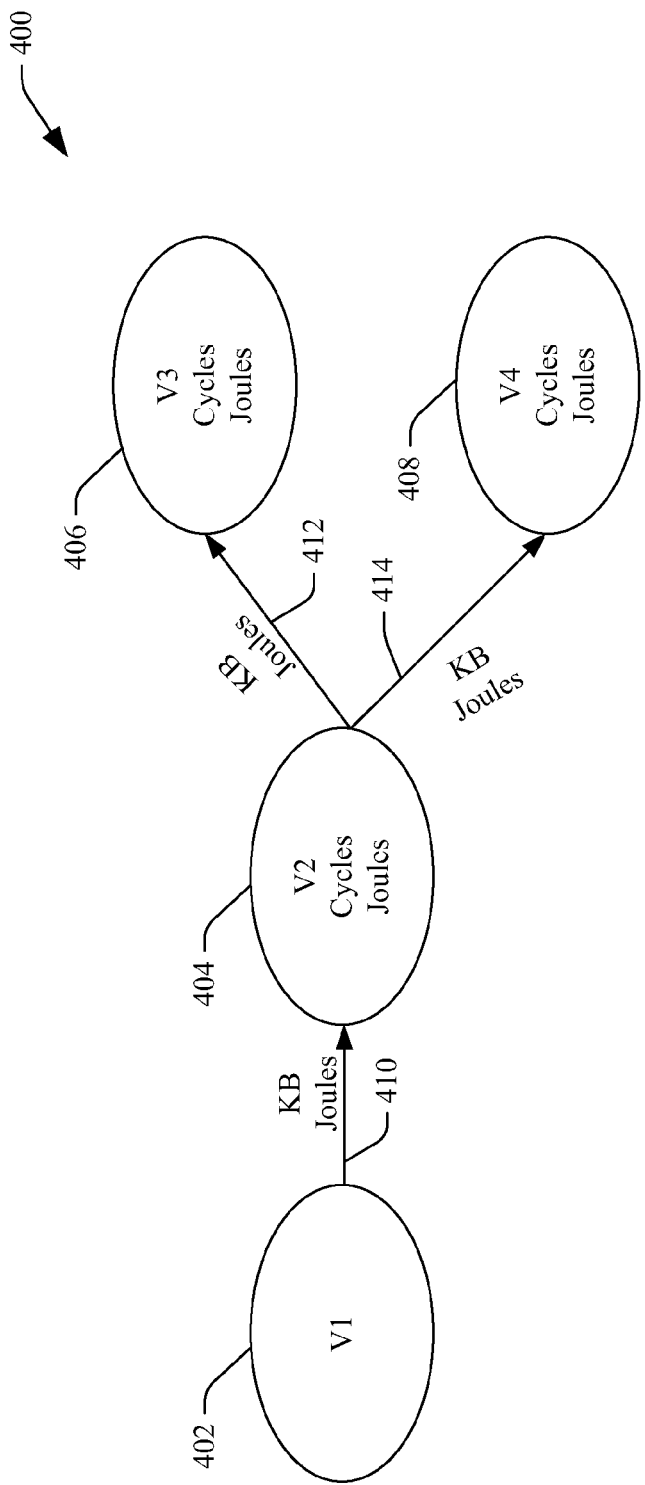
FIG. 4 is an example call graph of a portion of a computer program.

Referring now to FIG. 4, an example call graph pertaining to an example program is illustrated. The call graph 400 comprises a plurality of vertices 402-408 that represent methods of a program. The vertices 402-408 are connected to one another by edges 410-414 that represent calls between the methods. Therefore, for instance, a method represented by the vertex 402 is shown to call the method represented by the vertex 404 by the edge 410. Similarly, the method represented by the vertex 404 can call either the method represented by the vertex 406 or the method represented by the vertex 408, as represented by the edges 412 and 414, respectively. In this example, the method represented by the vertex 402 was not marked as being offloadable, while the methods represented by the vertices 404-408 have been marked by the developer as being offloadable.

For each individual offloadable method, the vertices 404-408 can be annotated to indicate computational and energy costs. The edges can be annotated to indicate size of a state corresponding to the methods represented by the vertices, and energy consumed to transfer this state from the mobile computing device 102 to the second computing device 104. As described above, a call graph such as the call graph 400 can be generated by the profiler component 220 and can be utilized by the solver component 222 to generate an estimate of energy savings of executing one or more of the methods represented by the vertices 404-408 on the second computing device 104 rather than on the mobile computing device 102.

With reference now to FIGS. 5-8, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be a non-transitory medium, such as memory, hard drive, CD, DVD, flash drive, or the like.

Figure 5:
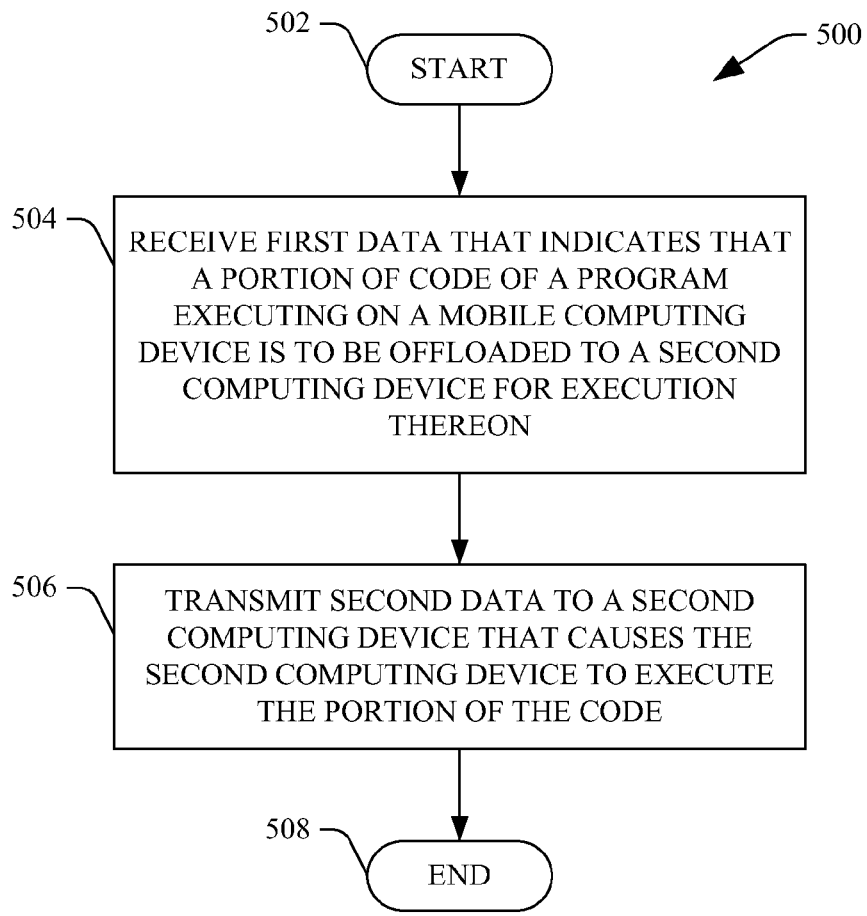
FIG. 5 is a flow diagram that illustrates an example methodology for offloading a portion of code for execution on a second computing device.

Referring now solely to FIG. 5, a methodology 500 that facilitates causing a portion of code to be offloaded for remote execution to save energy is illustrated. For instance, the methodology 500 can be executed by a mobile computing device. The methodology 500 begins at 502, and at 504 first data is received that indicates that a portion of code of a program (a method or class) executing on a mobile computing device is to be offloaded to a second computing device for execution thereon. The first data that is received is based at least in part upon an estimated energy savings of the mobile computing device of offloading the portion of the code to the second computing device.

At 506, second data is transmitted to a second computing device that causes the second computing device to execute the portion of the code. This second data may include an application state or state delta that can be utilized by the second computing device to execute the portion of the code. The methodology 500 completes at 508.

Figure 6:
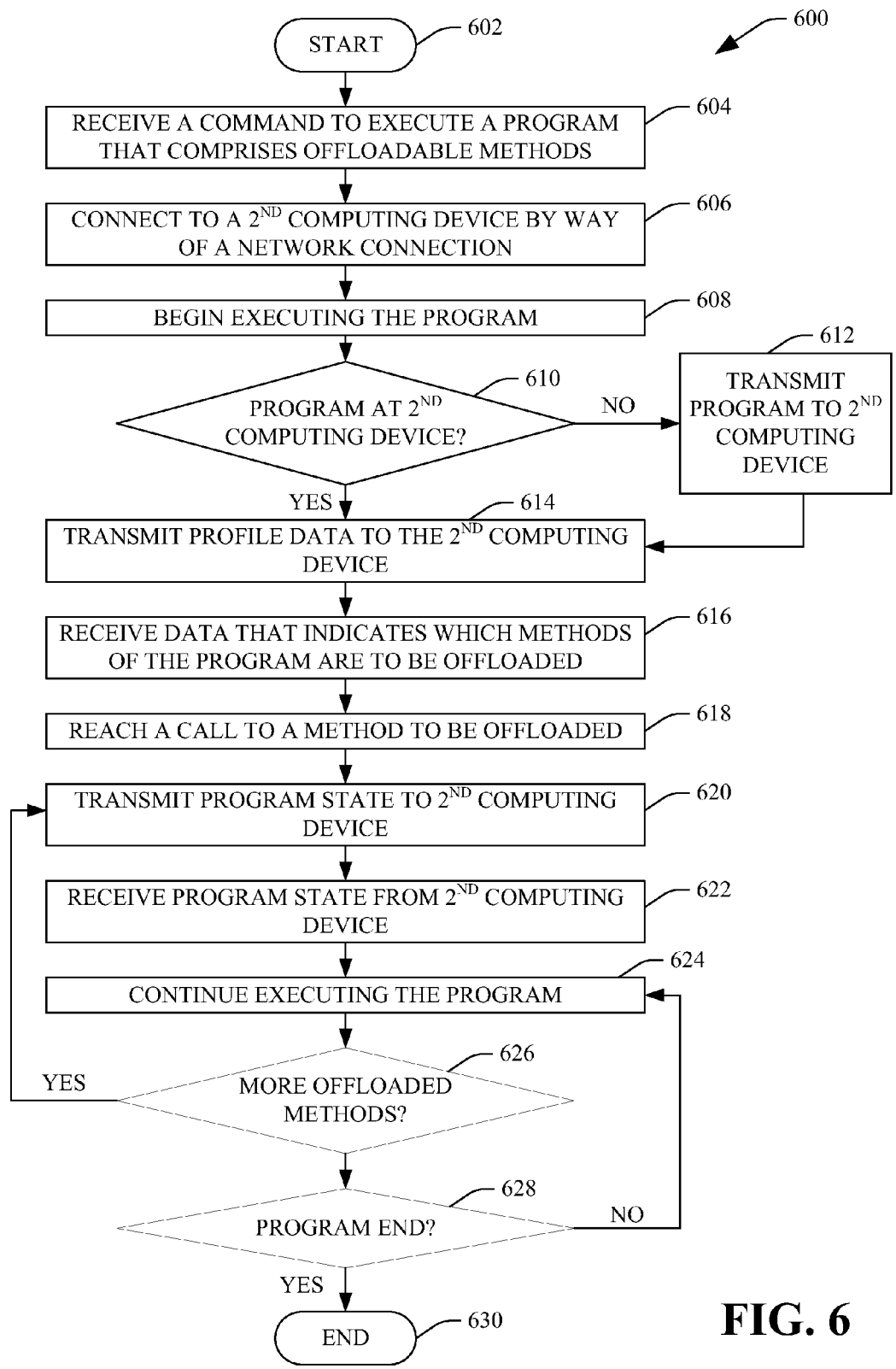
FIG. 6 is a flow diagram that illustrates an example methodology for offloading a portion of code from a mobile computing device for execution on a second computing device.

Turning now to FIG. 6, an example methodology 600 that facilitates selectively offloading code in an energy-aware manner is illustrated. In an example, the methodology 600 can be executed on a mobile computing device. The methodology starts at 602, and at 604 a command to execute a program is received from a user or process, wherein a program includes methods that are labeled by a developer as being offloadable. At 606, a connection is made to a second computing device by way of a network, wherein at least part of the connection is a wireless connection.

At 608, execution of the program on a mobile computing device begins. At 610, a determination is made regarding whether the second computing device already has the program. If the second computing device does not have the program, then at 612 the program is transmitted to the second computing device. If the second computing device already has the program, or after the program is transmitted to the second computing device, then at 614 profile data is transmitted to the second computing device. This profile data can be or include an energy profile of the mobile computing device, a network profile, and/or executed program profile. For instance, the program profile can be an initial estimate that can be refined over time based upon measurements pertaining to execution of methods on the mobile computing and/or on the second computing device.

At 616, data is received from the second computing device that indicates which methods of the program are to be offloaded for execution on the second computing device. At 618, during execution of the program on the mobile computing device, a call to a method to be offloaded is reached. At 620, the program state is transmitted from the mobile computing device to the second computing device upon reaching the call to the method.

Thereafter, the second computing device can execute the method remotely, and can transmit an updated program state back to the mobile computing device. At 622, an updated program state is received from the second computing device, and at 624 execution of the program resumes, utilizing the updated program state. Thereafter the program can continue executing again until a method to be offloaded is reached, at which point the methodology returns to 620. At 626, a determination is made regarding whether a method to be offloaded is reached. If a method to be offloaded is reached, the methodology 600 returns to 620. If a method to be offloaded has not been reached, then at 628 a determination is made regarding whether the program has completed. If the program has not completed, then the methodology returns to 624, and the program continues to execute. If the program has completed, then the methodology ends at 630.

Figure 7:
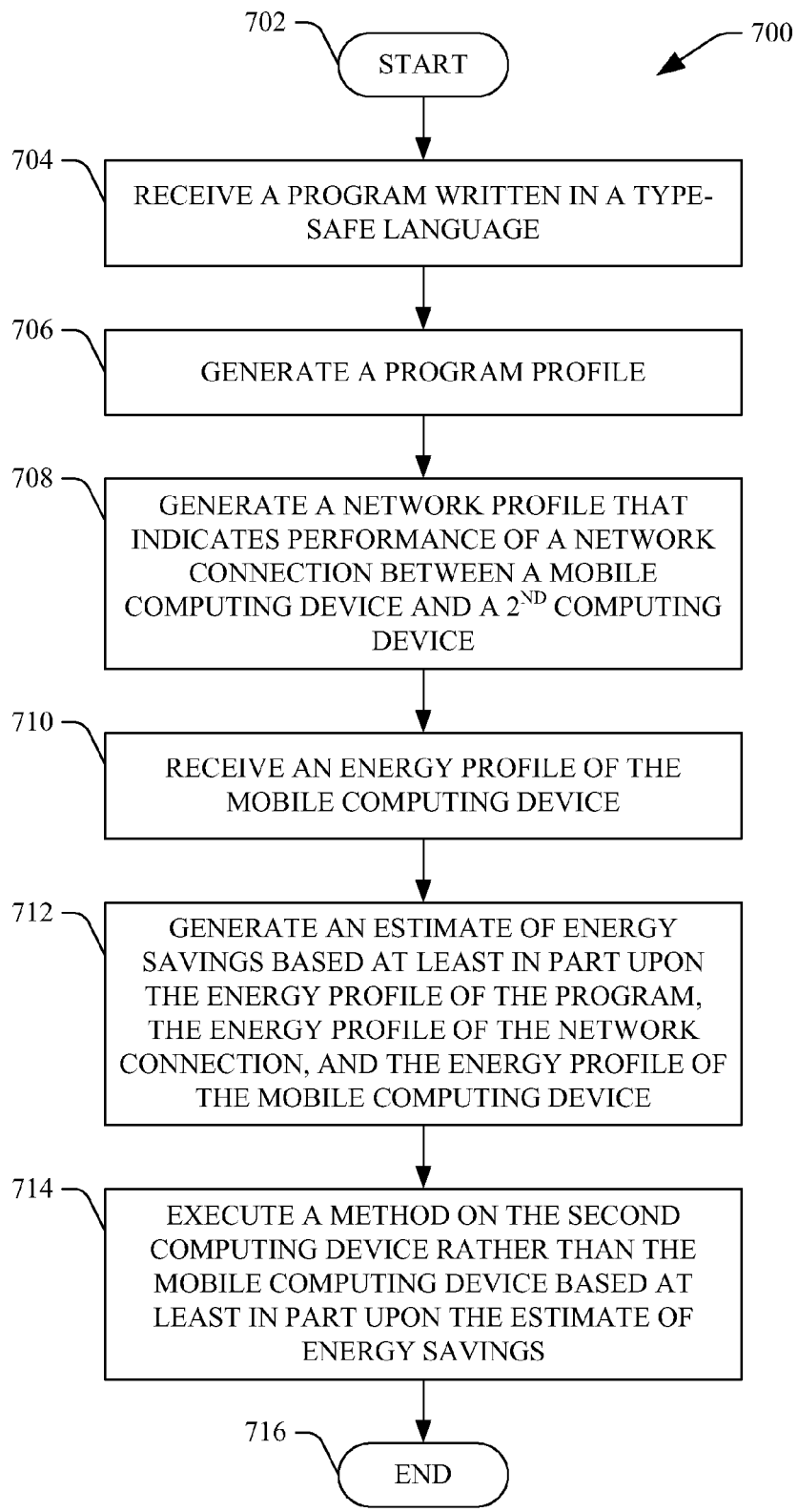
FIG. 7 is a flow diagram that illustrates an example methodology for executing code offloaded from a mobile computing device to a second computing device.

Now turning to FIG. 7, an example methodology 700 that facilitates selectively offloading code from a mobile computing device to a second computing device in an energy-aware manner is illustrated. In an example, the methodology 700 can be executed on a server, an access point, a switch, or a personal computing device. The methodology 700 starts at 702, and at 704 a program is received that is written in a type-safe language. At 706, an energy profile of the program is generated. The energy profile of the program can comprised or be based upon a call graph of the program, wherein the call graph can include annotations indicating state information pertaining to program states to be transferred between the mobile computing device and the second computing device, an amount of CPU cycles required to execute a method, an amount of energy consumed when executing the method, etc.

At 708, a network profile that pertains to energy consumed when transmitting data over a network connection between the mobile computing device and the second computing device and performance of such network connection is received. The network profile can be based upon an estimate of throughput of data on the network connection. At 710, an energy profile of the mobile computing device is received.

At 712, an estimate of energy savings with respect to executing a method on the second computing device versus executing the method on the mobile computing device is generated based at least in part upon the program profile, the network profile, and the energy profile of the mobile computing device. At 714, a method is executed on the second computing device rather than the mobile computing device based at least in part on the energy savings estimated at 712. The methodology 700 completes at 716.

Figure 8:
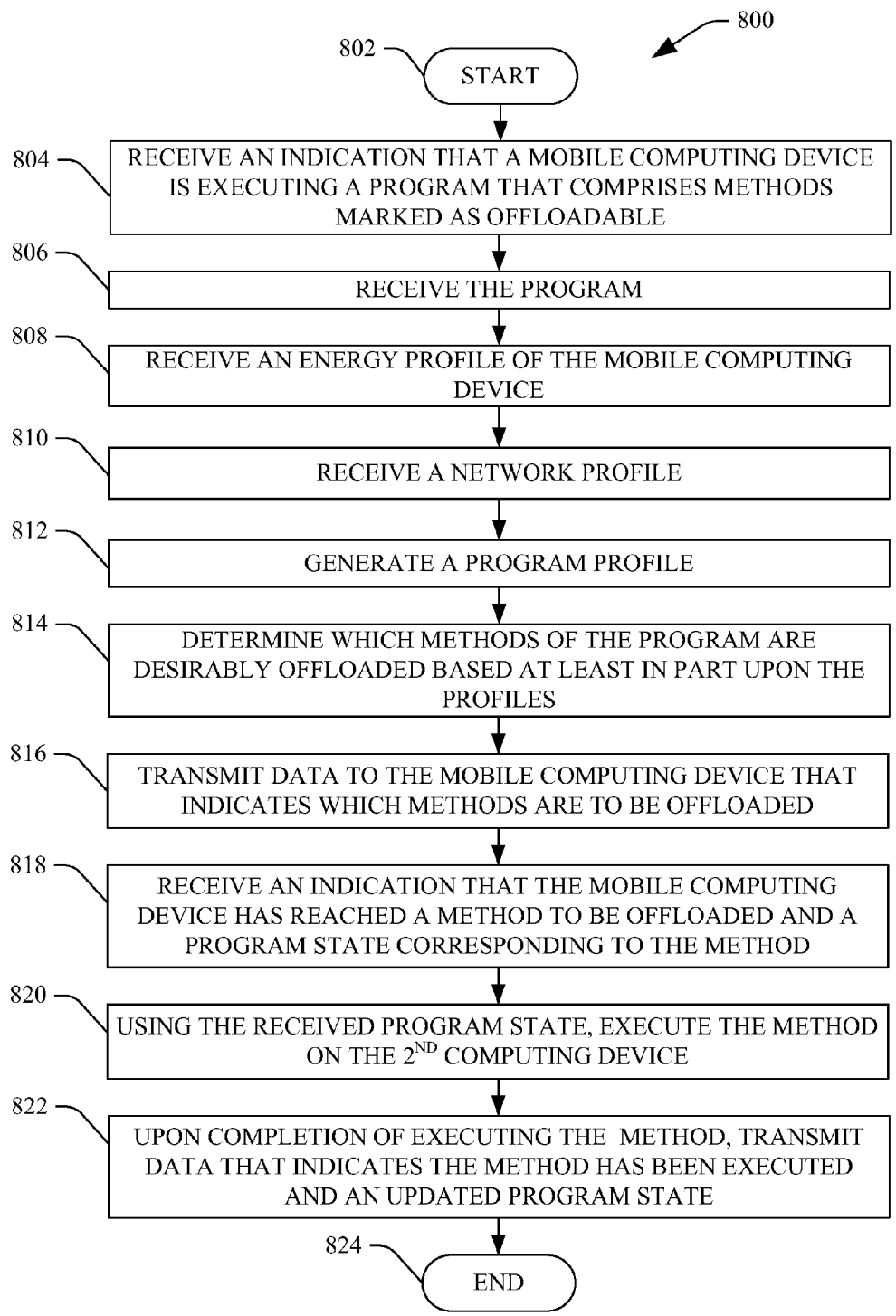
FIG. 8 is a flow diagram that illustrates an example methodology for executing code offloaded from a mobile computing device.

Turning now to FIG. 8, an example methodology 800 that facilitates offloading code for execution to an infrastructure device in an energy-aware manner is illustrated. The methodology 800 starts at 802, and at 804 an indication that a mobile computing device is executing a program that comprises methods marked as offloadable is received. At 806, the program is received, wherein the program can be received from the mobile computing device or from another computing device in the cloud.

At 808, an energy profile of the mobile computing device is received. At 810 a network profile is received. At 812 a program profile is received.

At 814, a determination is made of which methods of the program are desirably offloaded from the mobile computing device to the second computing device based at least in part upon the profiles received at 808, 810, and 812. At 816, data is transmitted to the mobile computing device that indicates which methods of the program are to be offloaded for execution on the second computing device.

At 818, an indication is received that the mobile computing device has reached a method to be offloaded for execution on the second computing device, and a program state corresponding to the method is also received. At 820, using the received program state, the method is executed on the second computing device. At 822, upon completion of executing the method, data is transmitted that indicates that the method has been executed, and an updated program state (e.g., in the form of a program state delta) is also transmitted to the mobile computing device. Thereafter, the mobile computing device can continue executing the program locally. The methodology 800 completes at 824.

Figure 9:
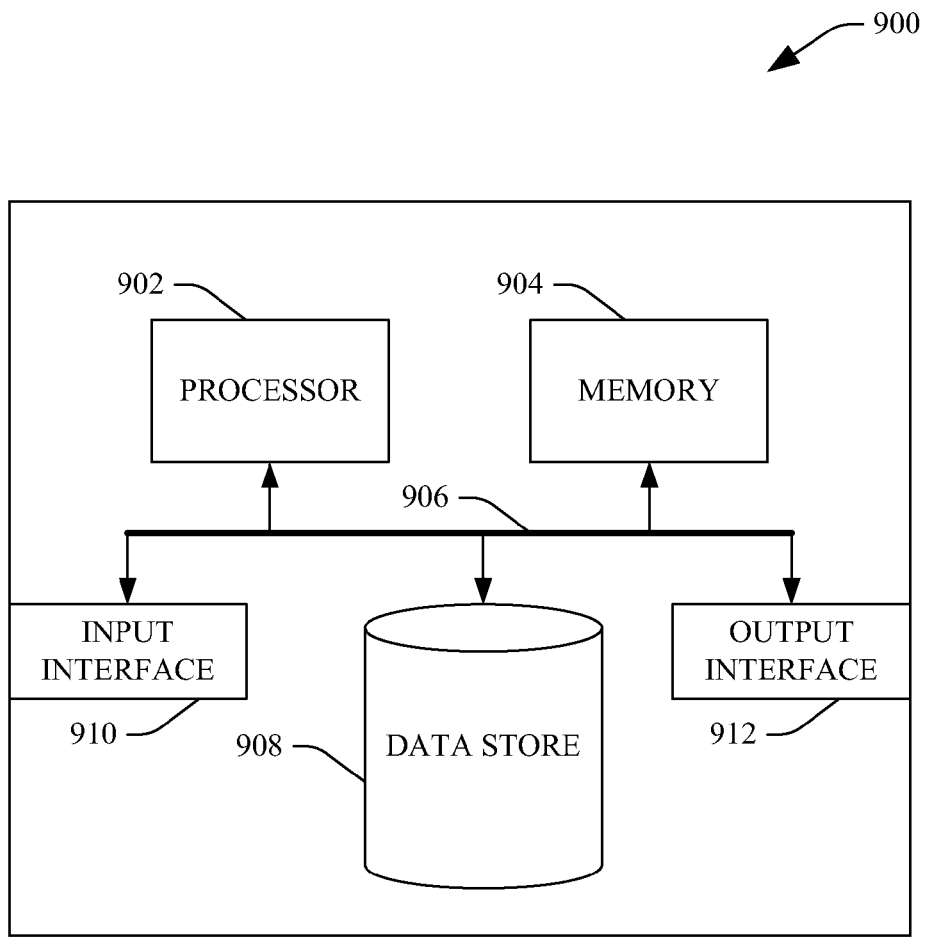
FIG. 9 is an example computing system.

Now referring to FIG. 9, a high-level illustration of an example computing device 900 that can be used in accordance with the systems and methodologies disclosed herein is illustrated. For instance, the computing device 900 may be used in a system that supports offloading portions of code in an energy-aware manner for execution on a second computing device. In another example, at least a portion of the computing device 900 may be used in a system that supports determining a program state for transmission to either a mobile computing device or an infrastructure device. The computing device 900 includes at least one processor 902 that executes instructions that are stored in a memory 904. The memory 904 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store program state, energy profiles, etc.

The computing device 900 additionally includes a data store 908 that is accessible by the processor 902 by way of the system bus 906. The data store 908 may be or include any suitable computer-readable storage, including a hard disk, memory, etc. The data store 908 may include executable instructions, energy profiles, program states, etc. The computing device 900 also includes an input interface 910 that allows external devices to communicate with the computing device 900. For instance, the input interface 910 may be used to receive instructions from an external computer device, from an individual, etc. The computing device 900 also includes an output interface 912 that interfaces the computing device 900 with one or more external devices. For example, the computing device 900 may display text, images, etc. by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:
   at a mobile computing device, receiving an indication that a portion of code of a program executing on the mobile computing device is to be offloaded to a second computing device for execution on the second computing device, wherein the indication is based at least in part upon an estimated energy savings of the mobile computing device by offloading the portion of the code for execution on the second computing device; and
   transmitting data to the second computing device that causes the second computing device to execute the portion of the code.

2. The method of claim 1, wherein the portion of the code is marked by a developer as being offloadable.

3. The method of claim 1, wherein the mobile computing device is a mobile telephone.

4. The method of claim 1, wherein the second computing device is a desktop computer.

5. The method of claim 1, wherein the estimated energy savings of the mobile computing device is computed on the mobile computing device.

6. The method of claim 1, wherein the second computing device is a server that is in communication with a network switch.

7. The method of claim 1, further comprising:
   instrumenting the program;
   obtaining a first measurement pertaining to energy consumed by executing the portion of the program based at least in part upon the instrumenting of the program;
   obtaining a second measurement pertaining to data transfer between the mobile computing device and the second computing device based at least in part upon the instrumenting of the program; and
   transmitting the first measurement and the second measurement to the second computing device.

8. The method of claim 1, further comprising:
   executing the program;
   reaching a method in the program that has been marked as being offloadable;
   determining a portion of a program state that is used during execution of the method; and
   transmitting the portion of the program state to the second computing device.

9. The method of claim 8, wherein the program state is represented as a change between a current program state and a previous program state.

10. The method of claim 8, further comprising:
    determining a device network profile that is indicative of performance of a network connection between the mobile computing device and the second computing device based at least in part upon a data throughput measurement pertaining to the transmitting of the program state to the second computing device; and
    transmitting the energy profile of the network connection to the second computing device.

11. The method of claim 10, further comprising transmitting an energy profile for the mobile device to the second computing device, wherein the energy profile is indicative of an amount of energy consumed by the mobile computing device per CPU cycle.

12. The method of claim 1, wherein the mobile computing device comprises a process virtual machine, wherein the program is executed in the process virtual machine.

13. The method of claim 1, wherein the program is written in a type-safe language.

14. A mobile computing device, comprising:
    a processor; and
    a memory that comprises a plurality of components that are executed by the memory, the plurality of components comprising:
       an interface component that receives an indication that a portion of code of a program executing on the mobile computing device is to be offloaded to a second computing device for execution on the second computing device, the second computing device in network communication with the mobile computing device, wherein the indication is based at least in part upon an estimated energy savings of the mobile computing device by offloading the portion of the code for execution on the second computing device; and
       a mobile transmitter component that transmits data to the second computing device that causes the second computing device to execute the portion of the code.

15. The mobile computing device of claim 14, wherein the portion of the code is marked by a developer of the portion of the code as being offloadable.

16. The mobile computing device of claim 14 being a mobile telephone.

17. The mobile computing device of claim 14, wherein the interface component and the mobile transmitter component are executed in a virtual machine.

18. The mobile computing device of claim 14, further comprising a data store that comprises an energy profile for the program, wherein the indication that the portion of code of the program executing on the mobile computing device is to be offloaded to the second computing device for execution on the second computing device is based at least in part upon the energy profile for the program.

19. The mobile computing device of claim 14, wherein the components further comprise a mobile proxy component that receives data from the second computing device that identifies a first method in the program that is to be executed on the mobile computing and identifies a second method in the program that is to be executed on the second computing device, wherein the portion of the code of the program comprises the second method.

20. A mobile telephone comprising a memory that includes instructions that, when executed by a processor of the mobile telephone, cause the processor of the mobile telephone to perform acts comprising:
    receiving an indication that a portion of code of a program executing on the mobile telephone is to be offloaded to a second computing device for execution on the second computing device, wherein the indication is based at least in part upon an estimated energy savings of the mobile telephone by offloading the portion of the code for execution on the second computing device; and
    transmitting data to the second computing device that causes the second computing device to execute the portion of the code.

* * * * *